United States Patent [19]

Kaneko

[11] Patent Number: 5,303,242
[45] Date of Patent: Apr. 12, 1994

[54] DESTUFFING CONTROL BY MODIFYING DETECTED POINTER WITH DIFFERENTIAL VALUE

[75] Inventor: Hiroaki Kaneko, Tokyo, Japan

[73] Assignee: NEC Corporation, Japan

[21] Appl. No.: 874,048

[22] Filed: Apr. 24, 1992

[30] Foreign Application Priority Data

Apr. 25, 1991 [JP] Japan .................................. 3-122464

[51] Int. Cl.⁵ .............................................. H04J 3/06
[52] U.S. Cl. ..................................... 370/102; 370/112; 375/112
[58] Field of Search ................ 370/84, 102, 110.1, 370/112, 100.1, 105.1; 375/111, 112

[56] References Cited

U.S. PATENT DOCUMENTS

| | | | |
|---|---|---|---|
| 4,658,152 | 4/1987 | Walters | 370/84 |
| 4,811,340 | 3/1989 | McEachern et al. | 370/102 |
| 4,935,921 | 6/1990 | Ishizaki et al. | 370/112 |
| 5,020,057 | 5/1991 | Taniguchi et al. | 370/102 |

*Primary Examiner*—Benedict V. Safourek
*Assistant Examiner*—Chau T. Nguyen
*Attorney, Agent, or Firm*—Ostrolenk, Faber, Gerb & Soffen

[57] ABSTRACT

In a digital communication system where a received stuff-synchronized TDM signal is demultiplexed into data signals each containing a sequence of frames. Each frame contains a pointer to indicate the start timing of the frame and specify positive, negative or zero destuffing. A pointer is detected from each data signal and compared with a previous pointer of the data signal stored in a memory. From this comparison the type of destuffing to be performed on a frame is determined, and in response to it, +1, −1 or 0 is added to the previous pointer to produce a current pointer, which is then used to rewrite the previous point. A binary block count value is generated by a single phase counter and compared with the current pointer to generate a start-of-frame signal if it equals the current value.

4 Claims, 4 Drawing Sheets

DESTUFFING CONTROL BY MODIFYING DETECTED POINTER WITH DIFFERENTIAL VALUE

BACKGROUND OF THE INVENTION

The present invention relates generally to digital communication systems, and more specifically to a destuffing circuit for a TDM (time division multiplex) signal.

As shown in FIG. 1, a prior art destuffing circuit comprises N identical units associated respectively with data signals demultiplexed from an incoming TDM (time division multiplex) signal. In each unit, the data signal is a sequence of frames each containing a pointer representing the start timing of the frame and the type of stuff either positive, negative or zero stuffing. The pointer is detected by a pointer detector 30-i (where i=1, 2, ... N) and supplied to a stuff discriminator 31-i in which it is examined to see if the frame of the pointer is to be positively or negatively stuffed or zero-stuffed. The output of stuff discriminator 31-i is applied to a selector 32-i for selectively passing one of high-, medium- and low-rate clock pulses from a clock generator 36 to a phase counter 33-i in which the selected clock is counted to produce a binary output. This binary output is applied to a comparator 34-i in which it is compared with the pointer detected by the associated detector 30-i to detect a coincidence therebetween. When this occurs, comparator 34-i produces a signal indicating the start timing of a frame. A timing circuit 35-i is connected to comparator 34-i to generate various timing signals necessary for processing the data signal by using the start-of-frame signal.

However, it is disadvantageous to provide as many phase counters as there are data signals demultiplexed from a single incoming TDM signal as they add to the complexity and overall dimensions of the destuffing circuit.

SUMMARY OF THE INVENTION

It is therefore an object of the present invention to provide a simplified destuffing circuit.

According to the present invention, there is provided a digital communication system for receiving a stuff-synchronized TDM signal and demultiplexing it into a plurality of data signals or sequences of frames. Each frame contains a pointer indicating the start timing of the frame and specifying one of positive, negative and zero destuffing. A pointer is detected from each of the data signals and compared with a previous pointer stored in a memory to determine the type of destuffing to be performed on a frame. Depending on the determined type, +1, −1 or 0 is added to the previous pointer to produce a current pointer with which the previous point is overwritten. Clock pulses are counted to produce a binary count, which is compared with the current pointer to generate a signal indicating the start timing of the frame if the current pointer is equal to the binary count.

According to this invention, a destuffing circuit is implemented by a single phase counter that counts clock pulses to produce a binary count. A plurality of pointer detectors are provided corresponding respectively to the data signals, each of the pointer detectors detecting a pointer from the corresponding data signal. Latches are associated respectively with the pointer detectors for storing a previous pointer. Stuff discriminators are associated respectively with the pointer detectors and the latches for comparing the pointer detected by the associated pointer detector with the previous pointer stored in the associated latch and determining therefrom the type of destuffing to be performed on a frame. Destuffing circuits are associated respectively with the stuff discriminators for adding +1, −1 or 0 to the previous pointer stored in the associated latch depending on the type of destuffing detected by the associated stuff discriminator to produce a current pointer, and causing the associated latch to rewrite the previous pointer with the current pointer. Comparators are associated respectively with the destuffing circuits for comparing the current pointer therefrom with the binary count from the phase counter to generate the start-of-frame signal when the current pointer is equal to the binary count.

BRIEF DESCRIPTION OF THE DRAWINGS

The present invention will be described in further detail with reference to the accompanying drawings, in which.

DETAILED DESCRIPTION

Figure 1:
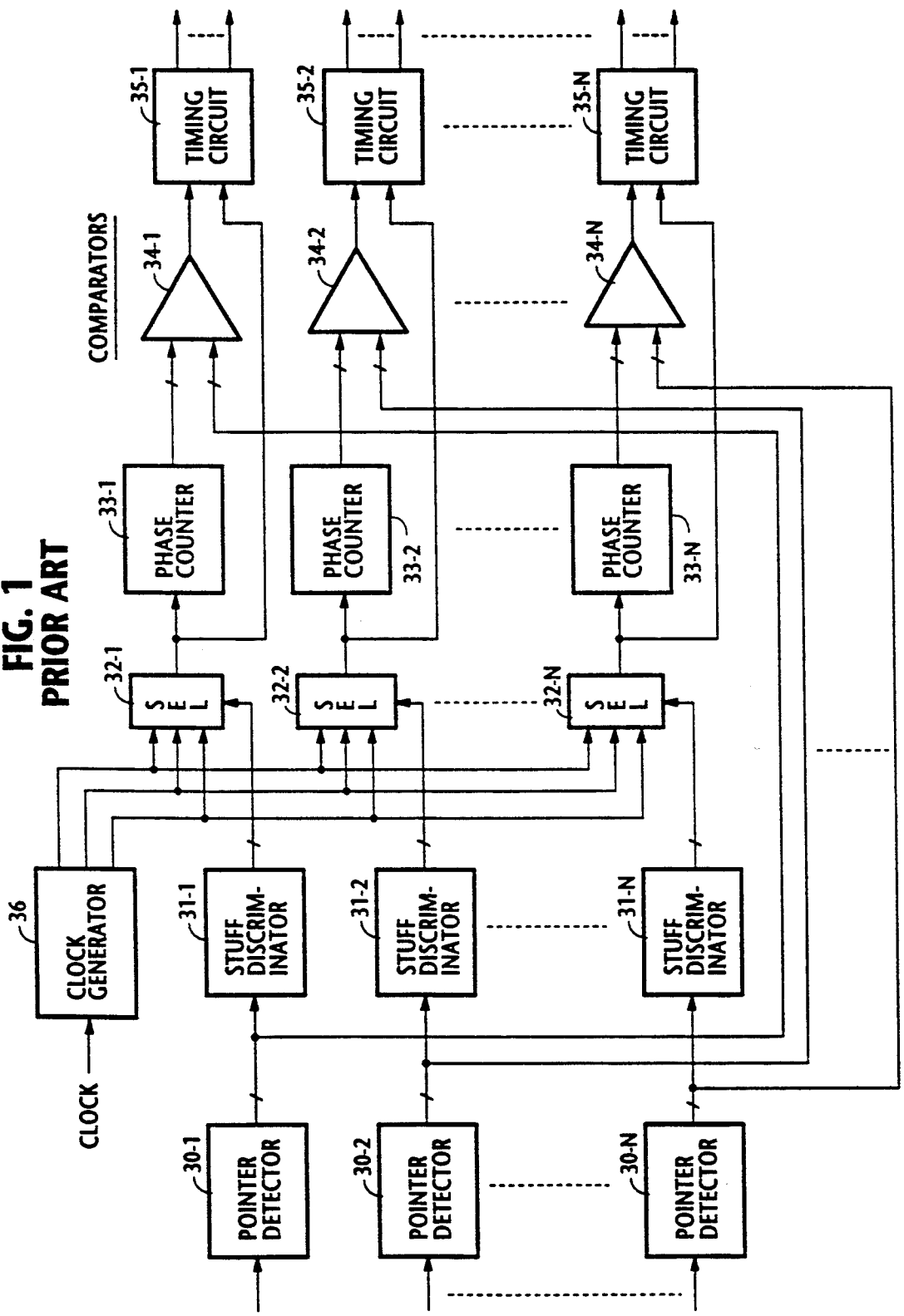
FIG. 1 is a block diagram of a prior art pulse destuffing circuit.
Figure 2:
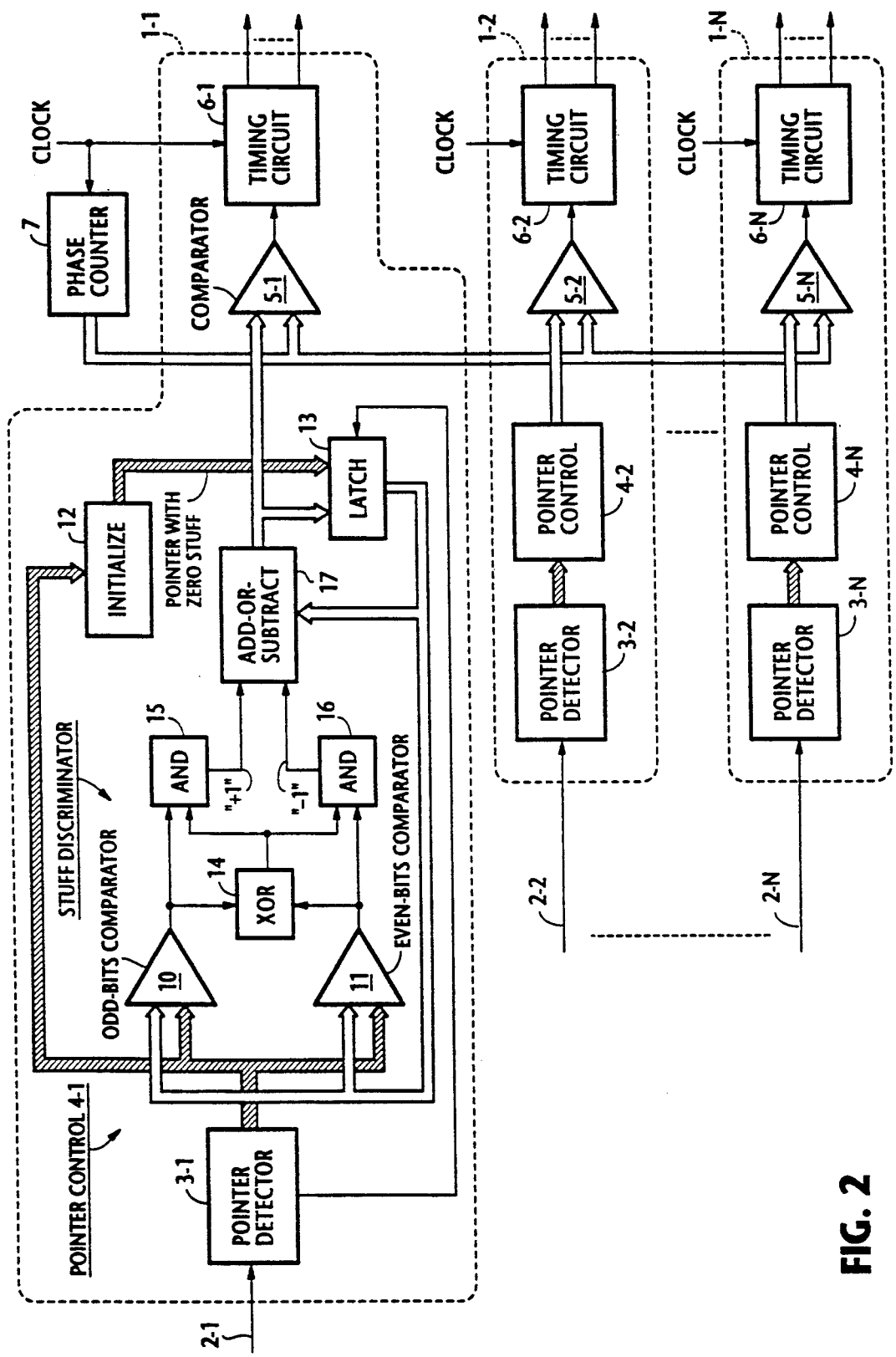
FIG. 2 is a block diagram of a pulse destuffing circuit of the present invention.

Referring now to FIG. 2, there is shown a destuffing circuit according to the present invention. As illustrated, the destuffing circuit is made up of a plurality of like units 1-i for receiving demultiplexed data signals which appear respectively on input lines 2-i (where i ranges from 1 through N). Each unit 1-i includes a pointer detector 3-i, a pointer control circuit 4-i, a coincidence detector or comparator 5-i and a timing circuit 6-i, all of which are connected in series to the associated input line 2-i. Clock pulses that are synchronized with the timeslots of the incoming TDM input are applied to a single phase counter 7 to produce a binary count of the clock. Pointer detector 3-i extracts a pointer from each frame of the demultiplexed data signal indicating the start timing of the data signal of that frame and the type (positive, negative or zero) of destuffing to be performed on that frame. Comparators 10, 11 and logic circuitry 14 to 15 comprise the stuff discriminator of unit 1-i.

As will be described in detail later, if zero destuffing is to be performed on an Mth frame, the pointer value "k" of this frame is a sequence of bits indicating the start timing of the data signal in that frame. If positive destuffing is to be performed on an (M+1)th frame, the output of pointer detector 3-i is a bit sequence in which the binary values of its odd-numbered bits are opposite to those of the corresponding odd-numbered bits of the Mth frame and one is added during the (M+1)th frame to the pointer value of the Mth frame to produce a pointer value "k+1". If negative destuffing is to be performed on an (M+3)th frame, the pointer of this frame is a bit sequence in which the binary values of its even-numbered bits are opposite to those of the corresponding even-numbered bits of the (M+2)th frame and one is subtracted during the (M+4)th frame from the pointer of the (M+2)th frame to produce a pointer value "k".

Returning to FIG. 2, each pointer control circuit 4-i includes an odd-bits comparator 10 and an even-bits comparator 11, each having a first input coupled to the output of pointer detector 3-i and a second input coupled to the output of a latch 13. An initialization circuit 12 is connected to the output of pointer detector 3-i to store a zero-stuff pointer value initially detected by pointer detector 3-i into latch 13. The outputs of comparators 10 and 11 are connected to an exclusive-OR gate 14 AND gates 15, 16 to which the output of exclusive-OR gate 14 is also connected. A destuffing circuit, or add-or-subtract circuit 17 is provided for receiving add-one and subtract-one command signals respectively supplied from AND gates 14 and 15 in order to add "+1" or "−1" to the pointer value of a previous frame that is stored in the latch 13 in response to a latch timing signal from pointer detector 3-i. The pointer value modified by the add-or-subtract circuit 17 is stored back into latch 13 to be used during the next frame as a previous pointer. The output of add-or-subtract circuit 17 is further applied to comparator 5-i. The comparators 10, 11, exclusive-OR gate.

Odd-bits comparator 10 produces a logic 1 when the odd-numbered bits of the detected pointer are reversals of the corresponding odd-numbered bits of the previous pointer, and even-bits comparator 11 produces a logic 1 when the even-numbered bits of the detected pointer are reversals of the corresponding even-numbered bits of the previous pointer.

The effect of exclusive-OR gate 12 and AND gates 13, 14 is to prevent the unit 1-i from being adversely affected by a timing error which might result in the simultaneous generation of logic-1 outputs from comparators 10 and 11. Therefore, AND gate 15 exclusively generates a logic 1 when the output of odd-bits comparator 10 goes high, and AND gate 16 exclusively produces a logic 1 when the output of even-bits comparator 11 goes high. Add-or-subtract circuit 17 receives the logic-1 outputs of AND gates 15 and 16 as add-one and subtract-one command signals, while ignoring logic 0's from the AND gates.

Comparator 5-i makes a comparison between the output of add-or-subtract circuit 17 and the output of phase counter 7. If they match, comparator 5-i supplies a coincidence signal indicating the start timing of a frame to timing circuit 6-i to which the clock pulse is also applied.

Figure 3:
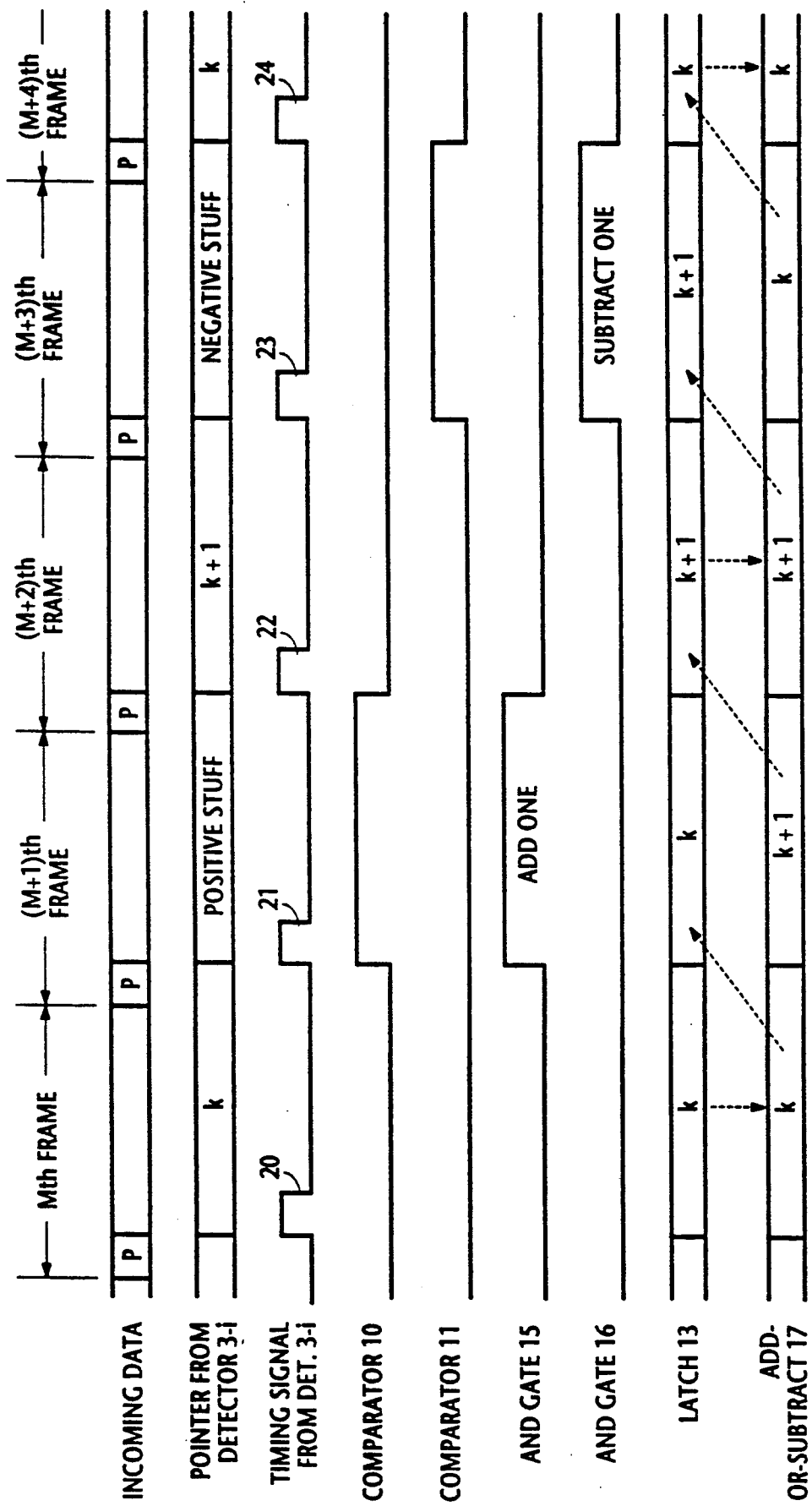
FIG. 3 is a timing diagram for describing the operation of the embodiment of the present invention.
Figure 4:
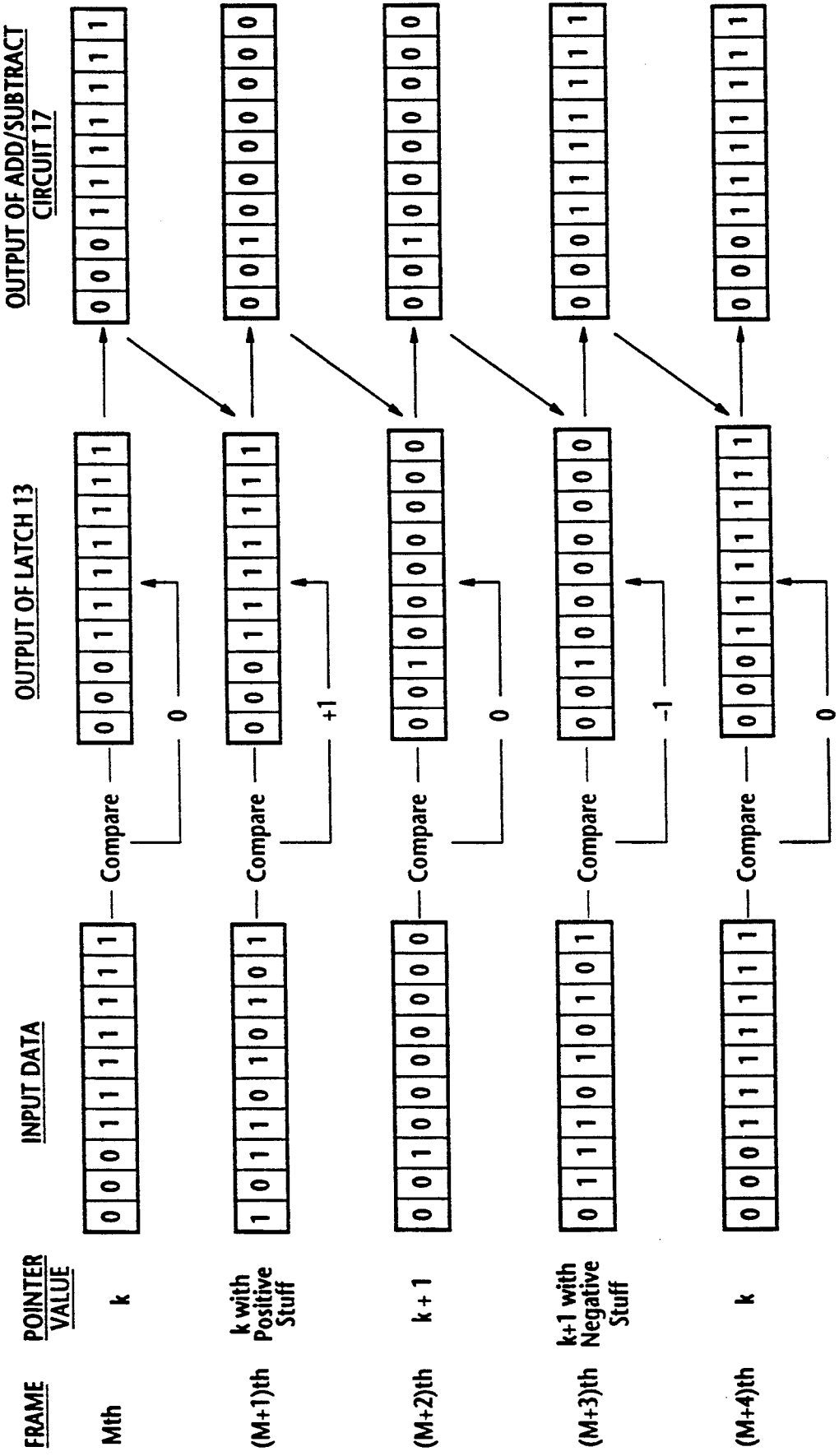
FIG. 4 is a view showing data bit sequences occurring during successive frames.

For a full understanding of the present invention, the operation of the unit 1-i will be described with reference to FIGS. 3 and 4.

Assume that during an Mth frame, pointer detector 3-i detects a pointer value "k" (=0001111111) and the same pointer value is stored in latch 13. These pointer values are compared with each other and a logic 0 is produced by each of comparators 10, 11 and supplied to AND gates 15, 16. Exclusive-OR gate 14 also supplies a logic 0 to AND gates 15, 16. Thus, each AND gate produces a logic 0, and hence add-or-subtract circuit 17 passes the contents of latch 13 to its output terminal. The same pointer value thus appears at the output of add-or-subtract circuit 17 and is stored back into latch 13 in response to a timing signal 20 from pointer detector 3-i and applied to comparator 5-i.

During the (M+1)th frame, the pointer value detected is a bit sequence "1011010101" which is representative of the value k with positive stuff. Since the odd-numbered bits of this sequence are reversals of those of the corresponding odd-numbered bits of pointer value "k", odd-bits comparator 10 produces a logic 1 and even-bits comparator 11 produces a logic 0. Thus, exclusive-OR gate 14 produces a logic 1, and an add-one command signal is supplied to add-or-subtract circuit 17 in which a "1" is added to the value k stored in latch 13, producing a pointer value "k+1" (=0010000000) at the output of add-or-subtract circuit 17. The pointer value "k+1" is stored back into latch 13 in response to a timing signal 21 and applied to comparator 5-i.

During the (M+2)th frame, the input data is a zero-stuff bit sequence "0010000000" equal to the contents of latch 13, and pointer detector 13 detects a pointer value "k+1". Both AND gates produce logic 0's and the contents of latch 13 remain unchanged by latching the same k+1 value again into latch 13 in response to a timing pulse 22.

During the (M+3)th frame, the input data contains a negative-stuff bit sequence "0111010101" having a pointer value "k+1." Since the even-numbered bits are reversals of the corresponding even-numbered bits of a zero-stuff k+1 pointer value, even-bits comparator 11 produces a logic 1 and AND gate 16 supplies a subtract-one command signal to add-or-subtract circuit 17. The k+1 value from latch 13 is decremented by one and a pointer value "k" (=0001111111) is stored back into latch 13 in response to a timing pulse 23.

During the (M+4)th frame, the pointer value of the input data is a zero-stuff bit sequence with a pointer value "k" (=0001111111), which is compared with the same pointer value stored in latch 13, producing a logic 0 at the output of each comparator 10, 11. The pointer value stored in latch 13 is again stored back in response to a timing signal 24 as a reference for a subsequent frame.

What is claimed is:

1. In a digital communication system for receiving a stuff-synchronized TDM (time-division multiplex) signal and demultiplexing the TDM signal into a plurality of data signals each being a sequence of frames, each of the frames containing a pointer indicating a head position of the frame and specifying one of positive, negative and zero destuffing, a destuffing method comprising the steps of:

a) generating clock pulses and producing therefrom a common binary count for said TDM signal;
   b) detecting a pointer from each of said data signals;
   c) comparing the pointer detected by the step b) with a previous pointer stored in one of a plurality of memories respectively provided for each of said data signals and determining therefrom a status of destuffing to be performed on a given frame of each data signal;
   d) adding +1, −1 or 0 to said previous pointer depending on the type of destuffing determined by the step c) to produce a current pointer for each of said data signals and rewriting the previous pointer stored in said one of the memories with the current pointer; and
   e) comparing the current pointer produced by the step d) for each of said data signals with the common binary count produced by the step a) and producing a signal indicating the head position of said given frame if the current pointer is equal to said common binary count.

2. In a digital communication system for receiving a stuff-synchronized TDM (time-division multiplex) signal and demultiplexing the TDM signal into a plurality of data signals each being a sequence of frames, each of the frames containing a pointer indicating a head position of the frame and specifying one of positive, negative and zero destuffing, a destuffing method comprising the steps of:

a) generating clock pulses and producing therefrom a common binary count for said TDM signal;

b) detecting a pointer from each of said data signals;

c) storing the pointer in one of a plurality of memories associated respectively with said data signals if the detected pointer specifies said zero destuffing;

d) comparing the pointer detected by the step b) with a previous pointer stored in said one of the memories and determining therefrom a status of destuffing to be performed on a given frame;

e) adding +1, −1 or 0 to the previous pointer stored in said memory depending on the status of destuffing determined by the step d) to produce a current pointer for each of said data signals and rewriting contents of said memory with the current pointer; and f) comparing said current pointer produced by the step e) for each of said data signals with the common binary count produced by the step a) and producing a signal indicating the head position of said given frame if the current pointer is equal to said common binary count.

3. A destuffing circuit for a plurality of data signals separated from a stuff-synchronized time-division multiplex signal, wherein each of said data signals is a sequence of frames and each of the frames includes a pointer indicating a head position of the frame and specifying one of positive, negative and zero destuffing to be performed on the frame, the destuffing circuit comprising:

a common phase counter for counting clock pulses and producing a common binary count of the clock pulses;

a plurality of pointer detectors corresponding respectively to said data signals, each of the pointer detectors detecting a pointer from the corresponding data signal;

a plurality of stuff discriminators associated respectively with said pointer detectors, each of the stuff discriminators comparing the pointer detected by the associated pointer detector with a previous pointer and determining therefrom a status of destuffing to be performed on a given frame;

a plurality of destuffing means associated respectively with said stuff discriminators, each of the destuffing means adding +1, −1 or 0 to said previous pointer depending on the status of destuffing detected by the associated stuff discriminator and producing therefrom a current pointer; and a plurality of comparators associated respectively with said destuffing means, each of the comparators comparing the current pointer from the associated destuffing means with the binary count produced by said phase counter and generating a signal indicating the head position of said given frame when the current pointer is equal to said binary count.

4. A destuffing circuit for a plurality of data signals separated from a stuff-synchronized time-division multiplex signal, wherein each of said data signals is a sequence of frames and each of the frames includes a pointer indicating a head position of the frame and specifying one of positive, negative and zero destuffing to be performed on the frame, the destuffing circuit comprising:

a common phase counter for counting clock pulses and producing a common binary count of the clock pulses;

a plurality of pointer detectors corresponding respectively to said data signals, each of the pointer detectors detecting a pointer from the corresponding data signal;

a plurality of storage means associated respectively with said pointer detectors for storing a previous pointer;

a plurality of stuff discriminators associated respectively with said pointer detectors and said storage means, each of the stuff discriminators comparing the pointer detected by the associated pointer detector with the previous pointer stored in the associated storage means, and determining therefrom a status of destuffing to be performed on a given frame;

a plurality of destuffing means associated respectively with said stuff discriminators, each of the destuffing means adding +1, −1 or 0 to the previous pointer stored in the associated storage means depending on the status of destuffing detected by the associated stuff discriminator to produce a current pointer, and causing said storage means to rewrite the previous pointer with said current pointer; and a plurality of comparators associated respectively with said destuffing means, each of the comparators comparing the current pointer from the associated destuffing means with the binary count produced by said phase counter and generating a signal indicating the head position of said given frame when the current pointer is equal to said binary count.

* * * * *